United States Patent [19]
Citta et al.

[11] Patent Number: 5,574,509
[45] Date of Patent: Nov. 12, 1996

[54] ANTENNA ORIENTATION SYSTEM FOR DIGITAL TV RECEIVER

[75] Inventors: Richard W. Citta, Oak Park; Gary J. Sgrignoli, Mount Prospect, both of Ill.

[73] Assignee: Zenith Electronics Corporation, Glenview, Ill.

[21] Appl. No.: 303,989

[22] Filed: Sep. 8, 1994

[51] Int. Cl.⁶ .................................................. H04N 5/50
[52] U.S. Cl. ............................................ 348/569; 348/563
[58] Field of Search ........................... 455/226.1, 226.2, 455/226.3, 226.4; 348/578, 21, 553, 563, 569, 570, 725

[56] References Cited

U.S. PATENT DOCUMENTS 4,935,814  6/1990  Omoto et al. ...................... 348/570 X
5,289,178  2/1994  Schwendeman ..................... 455/226.1

*Primary Examiner*—Victor R. Kostak
*Assistant Examiner*—Nathan J. Flynn

[57] ABSTRACT

An antenna adjustment system for a digital television receiver includes a graphics generator for receiving an error signal input and developing an on-screen signal quality display. An antenna is positionable by the viewer while referring to the on-screen signal quality display which enables optimal orientation of the antenna for best signal quality. The error signal is developed by comparing a rugged frame sync in the received television signal with a reference frame sync in the television receiver.

9 Claims, 3 Drawing Sheets

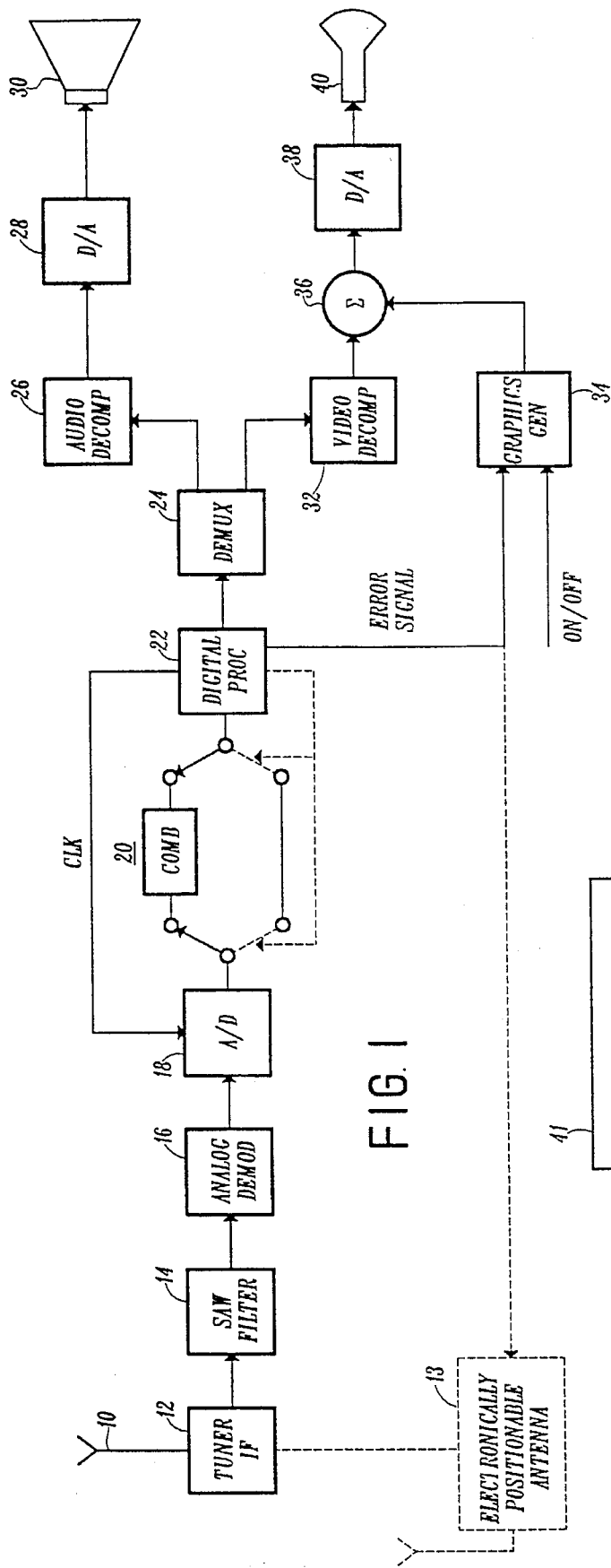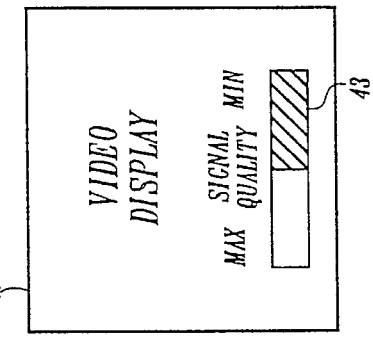

5,574,509

ANTENNA ORIENTATION SYSTEM FOR DIGITAL TV RECEIVER

BACKGROUND OF THE INVENTION AND PRIOR ART

This invention relates generally to digital television receivers and specifically to a technique for optimally orientating an antenna for a digital television receiver.

The Zenith proposed HDTV television system incorporates a digital television signal that consists of repetitive frames of data segments, each comprising a plurality of symbols, with each data segment being headed by a data segment sync code and an initial data segment comprising a frame sync code. The sync codes consist of rugged two level symbols and the other data and video portions comprise eight level symbols. The data is error protected and interleaved. Additionally, since the HDTV signals may exist in the same environment with NTSC co-channels, special processing circuitry is available for discriminating against NTSC co-channel signals. The above system is presently undergoing FCC evaluation testing.

The HDTV digital television signal is of lower power than the corresponding NTSC signal, and consequently antenna orientation for terrestrial broadcasts can be of extreme importance. The present invention describes a technique for accurately orientating or positioning the antenna for optimal reception of the digital television signal. The antenna may comprise an indoor antenna such as a rabbit-ears or bow-tie, or an outdoor antenna. Also, the antenna may comprise an electronically positionable or controlled antenna such as a phased-array antenna or a motorized antenna.

OBJECTS OF THE INVENTION

A principal object of the invention is to provide an improved digital television signal receiver.

Another object of the invention is to provide a method of optimally orientating an antenna for a digital television receiver.

BRIEF DESCRIPTION OF THE DRAWING

These and other objects and advantages of the invention will be apparent upon reading the following description in conjunction with the drawings, in which:

FIG. 1 is a simplified block diagram of a digital television receiver constructed in accordance with the invention;

FIG. 2 is a video display of a CRT with a graphical indication of the error signal in accordance with the invention;

DESCRIPTION OF THE PREFERRED EMBODIMENT

Figures 3, 4:
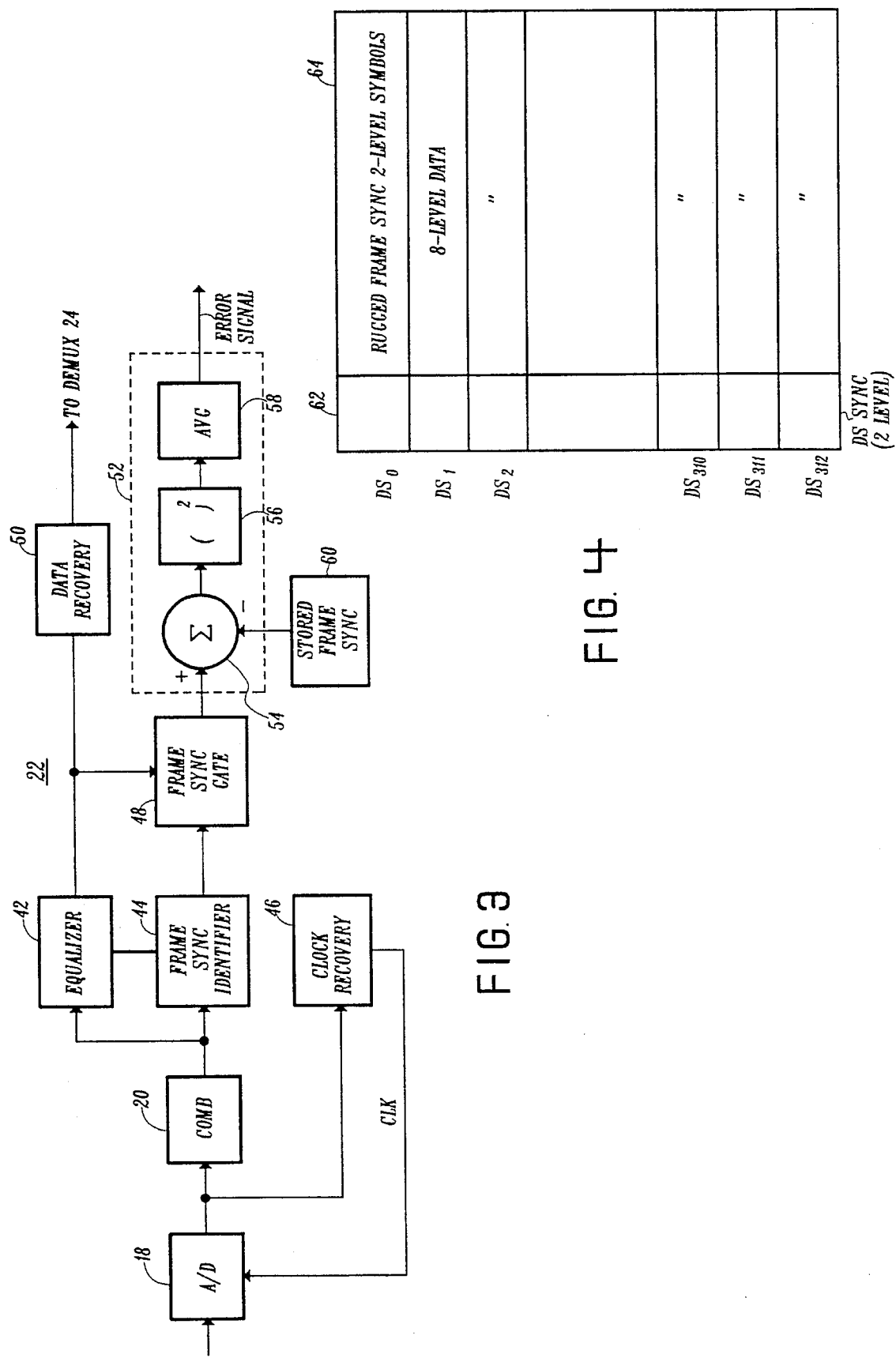
FIG. 3 is a more detailed block diagram of the digital processor of FIG. 1.
FIG. 4 illustrates a data frame of the digital television signal.

Referring to FIG. 1, an antenna 10 is coupled to a tuner/IF section 12 of a digital television receiver. Antenna 10 is positionable to enable optimal orientation thereof for reception of a digital television signal, preferably comprising a digitally encoded VSB signal as described in U. S. Pat. No. 5,087,975. Tuner/IF section 12 is coupled to a SAW filter 14 that in turn is coupled to an analog demodulator 16 that supplies an analog-to-digital (A/D) converter 18. A comb filter selection circuit 20 includes a comb path for filtering NTSC signals and a non-comb path for use when not in the presence of NTSC interfering signals. The output of comb filter selection circuit 20 is coupled to a digital processor 22 that provides a clock signal for A/D 18. The operation of the comb filter selection circuit 20 may operate as in U. S. Pat. No. 5,260,793. The comb filter selection circuit is not necessary to the present invention. Digital processor 22 supplies a demultiplexer 24 which has two outputs, one supplying an audio decompression circuit 26 and another supplying a video decompression circuit 32. Audio decompression circuit 26 is coupled to a digital-to-analog (D/A) converter 28 and, after suitable further processing in well-known apparatus (not shown), drives a loudspeaker 30. Video decompression circuit 32 is coupled to an adder 36 that in turn supplies D/A converter 38. After further processing in well-known apparatus (not shown), the developed video signal drives a CRT 40. A graphics generator 34 supplies an input to adder 36 and in turn is supplied with an error signal from digital processor 22. An on/off signal for selectively enabling graphics generator 34 is also shown. As indicated by the dotted lines, an electronically positionable antenna, as discussed above, may be supplied with the error signal for orientation purposes, and is coupled to tuner/IF 12. It will be appreciated that conventional color processing circuitry is omitted from the simplified diagram for clarity.

In FIG. 2, a video display on the viewing screen 41 of CRT 40 is illustrated. The display graphically depicts the quality of the received digital signal. When the display indicates high signal quality, i.e. the illuminated bar 43 is of maximum length and the antenna is optimally orientated for receiving the digital television signal.

In FIG. 3, digital processor 22 is shown in more detail. A/D 18 supplies comb 20, which in turn supplies an equalizer 42 and a frame sync identifier 44. A/D 18 also supplies a clock recovery circuit 46. Equalizer 42 may be conventional and comprises a tapped filter that adjusts the input signal amplitude and phase to correct linear distortion, e.g. multipath distortion, in the received signal. This is generally performed by comparing a training sequence (which may be a stored representation of the frame sync code, for example) with the recovered training sequence (or frame sync code) and adjusting the filter taps to minimize any differences therebetween. The output of equalizer 42 is coupled to a data recovery circuit 50 (which supplies demultiplexer 24) and to a frame sync gate 48 that is controlled by a signal from frame sync identifier 44. Frame sync identifier 44 is fully disclosed in copending application Ser. No. 08/204,972 and can be used to determine whether the received signal should be subject to the combed or uncombed path and to produce a control signal for enabling frame sync gate 48 to pass the frame sync from equalizer 42. A comparison circuit 52 comprises an adder 54, a squaring circuit 56 and an averaging circuit 58 for producing a mean square error signal based upon the energy in the error signal which is the difference between the received frame sync code and the stored frame sync code from block 60. It will be appreciated that the mean square error of the received frame sync code is indicative of received signal quality and that proper antenna orientation, for example, will improve the received signal quality thereby resulting in a lower frame sync error energy. Therefore by visually observing the bar chart on the CRT while adjusting the antenna, the viewer can optimally orientate the antenna for the best signal reception for his location.

In FIG. 4, a frame of data is shown as consisting of 313 data segments labelled $DS_0$–$DS_{312}$. The initial four symbols of each data segment comprise data segment sync 62, which consists of rugged two level symbols. The first data segment $DS_0$ includes a series of two level symbols 64 that comprise the rugged frame sync. The remaining symbols $DS_1$–$DS_{312}$ comprise data symbols that are indicated as 8-level data. These various data segments will be interleaved and will include error protection information and the like as well as video, audio and ancillary data. There are 832 symbols per data segment and the symbol rate is approximately 10.7 megasymbols per second.

Operation of the system is straightforward. In response to the reception of a digital television signal, the frame sync identification system enables the recovered frame sync from the equalizer to be compared with the stored frame sync and generates an error signal based on the comparison. In practice, this is accomplished by combining the frame sync from the equalizer with the stored frame sync in a negative or subtractive manner in adder 54, squaring the result in squaring circuit 56 and averaging that result in averaging circuit 58. The mean square error is supplied to graphics generator 34 in FIG. 1 and a suitable video display thereof is produced for mixing with the video signal supplied to CRT 40. The display chosen for purposes of illustration is a horizontal bar graph with the signal quality being indicated by the size of the bar. An operator manually adjusting antenna 10 and noting the visual display of the signal quality on the television receiver viewing screen can readily adjust the antenna orientation for optimal reception of the digital video television signal.

The foregoing operation is facilitated by the receiver which is capable of effecting carrier, clock and sync recovery even under adverse conditions. In particular, the operation is facilitated by the use of the rugged two level recovered frame sync code to generate the visual display. This allows a meaningful display to be produced even under very poor signal conditions when data cannot be accurately recovered.

In FIG. 3, the recovered frame sync code is supplied to the frame sync gate 48 from the output of the equalizer 42. Therefore the error signal will reflect the corrective effect of the equalizer on the incoming signal. That may not be ideal in a practical arrangement with a digital signal since it may be that a slight change in antenna orientation may result in a signal that the equalizer cannot adequately correct, which could lead to a loss of video. Such is referred to as the "cliff effect".

Figure 5:
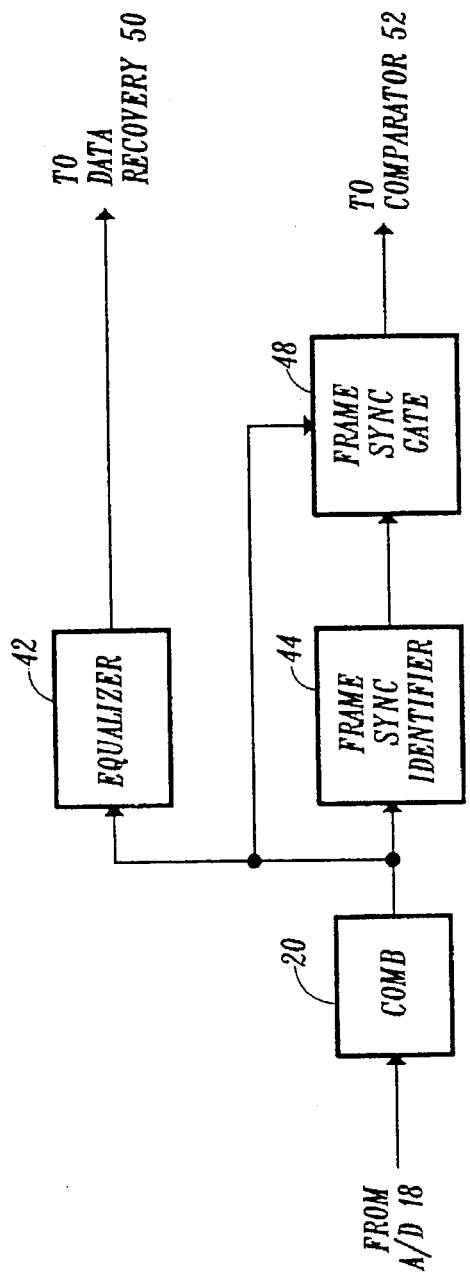
FIG. 5 illustrates an alternative arrangement of the invention.

In FIG. 5, the recovered frame sync is supplied from the input of the equalizer 42 to the frame sync gate 48. The recovered frame sync has not been subject to the corrective effect of the equalizer and may represent a preferred implementation. Since testing of these approaches is still ongoing, no definitive answer can be given.

Figure 6:
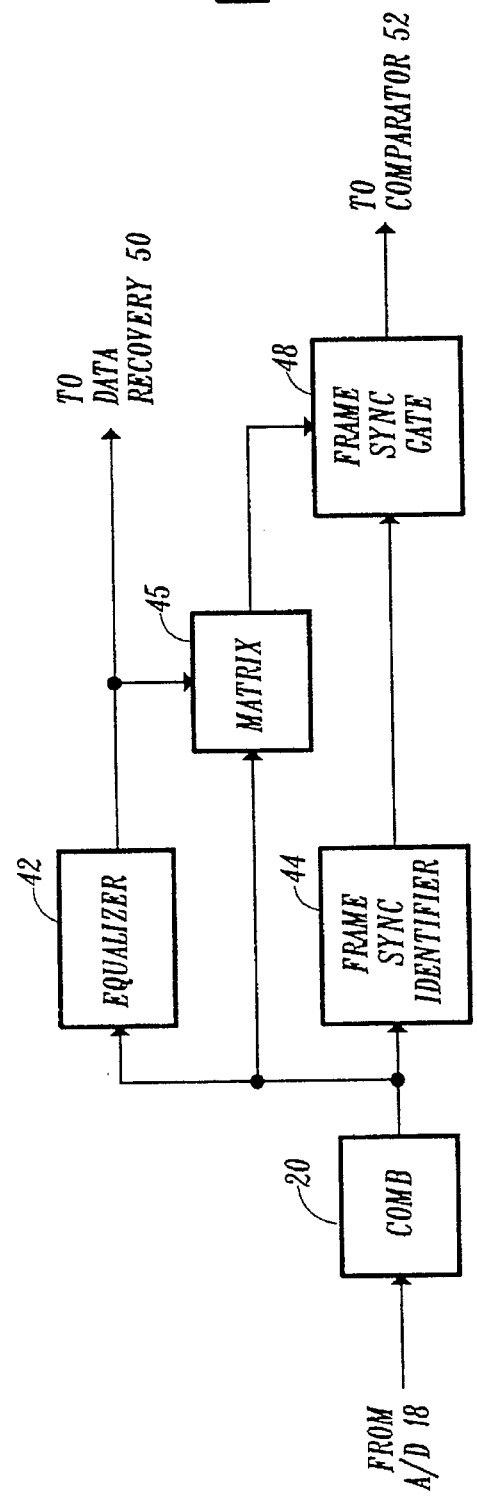
FIG. 6 illustrates another alternative arrangement of the invention.

In FIG. 6, an arrangement is shown where the recovered frame sync is supplied from a matrix 45 that combines the signals at the input and the output of equalizer 42. This may prove to be the preferred implementation. Those skilled in the art will be aware that the invention encompasses all of the above variants. Also, as mentioned in connection with FIG. 1, the error signal may be used to control an electronically positionable antenna 13 through all possible orientations and being returned to the one position that produces the smallest error signal.

What has been described is a novel digital television receiver with means for enabling optimum orientation of the antenna for the received television signal. It is recognized that numerous changes in the described embodiment of the invention will be apparent to those skilled in the art without departing from its true spirit and scope. The invention is to be limited only as defined in the claims.

What is claimed is:

1. In combination:

a television receiver for processing digital signals;

a positionable antenna coupled to said television receiver for receiving a digital television signal including a robust frame sync symbol code, said television receiver including a reference frame sync symbol code;

means for comparing the frame sync symbol code in said digital signal with said reference frame sync symbol code for developing an error signal; and means including a graphics generator for producing a visual indication on a display screen of said television receiver based on said error signal for enabling optimal orientation of said positionable antenna.

2. The combination of claim 1 wherein said television receiver includes an equalizer for correcting certain errors in the received television signal based upon a known reference sequence; and wherein said frame sync symbol code is supplied from the output of said equalizer.

3. The combination of claim 1 wherein said television receiver includes an equalizer for correcting certain errors in the received television signal based upon a known reference sequence; and wherein said frame sync symbol code is supplied from the input of said equalizer.

4. The combination of claim 1 wherein said television receiver includes an equalizer for correcting certain errors in the received television signal based upon a known reference sequence and further including;

means for supplying said frame sync symbol code from both the input and the output of said equalizer.

5. A method of positioning a positionable antenna for optimal reception of a digital television signal comprising:

receiving a digital television signal with said antenna;

developing an error signal based upon comparing a reference frame sync symbol code in said television receiver with a recovered frame sync symbol code from said received television signal; and generating a graphics display on a viewing screen of said television receiver based upon said error signal for enabling optimum orientation of said antenna.

6. The method of claim 5 further including:

providing an equalizer for the received digital television signal; and supplying said recovered frame sync symbol code from the output of said equalizer.

7. The method of claim 5 further including:

providing an equalizer for the received digital television signal; and supplying said recovered frame sync symbol code from the input of said equalizer.

8. The method of claim 5 further including:

providing an equalizer for the received digital television signal; and supplying said reference frame sync symbol code from both the input and the output of said equalizer.

9. A method of orientating a positionable antenna for optimal reception of a digital television signal by reference to a display on a television receiver viewing screen comprising:

receiving a digital television signal with said antenna;

comparing a reference frame sync symbol code in the television receiver with a recovered frame sync symbol code from said received television signal;

developing an error signal based upon said comparison; and selectively generating a graphics display on said viewing screen based on said error signal for enabling orientation of said antenna for optimal reception of said digital television signal.

* * * * *